United States Patent
Nakatsuji

(10) Patent No.: US 12,043,028 B2
(45) Date of Patent: Jul. 23, 2024

(54) IMAGE FORMING APPARATUS

(71) Applicant: KYOCERA Document Solutions Inc., Osaka (JP)

(72) Inventor: Hiroomi Nakatsuji, Osaka (JP)

(73) Assignee: Kyocera Document Solutions, Inc. (JP)

( * ) Notice: Subject to any disclaimer, the term of this patent is extended or adjusted under 35 U.S.C. 154(b) by 134 days.

(21) Appl. No.: 17/949,820

(22) Filed: Sep. 21, 2022

(65) Prior Publication Data

US 2023/0096358 A1    Mar. 30, 2023

(30) Foreign Application Priority Data

Sep. 28, 2021 (JP) ................... 2021-157555

(51) Int. Cl.
*B41J 2/045* (2006.01)
*H04N 1/00* (2006.01)
*H04N 1/031* (2006.01)

(52) U.S. Cl.
CPC ......... *B41J 2/0451* (2013.01); *B41J 2/04586* (2013.01); *H04N 1/00031* (2013.01); *H04N 1/00045* (2013.01); *H04N 1/00082* (2013.01); *H04N 1/031* (2013.01)

(58) Field of Classification Search
CPC .. B41J 2/04508; B41J 2/0451; B41J 2/04586; B41J 2/155; B41J 2/165; B41J 2/16579; B41J 2/2132; B41J 2/2139; B41J 2/2142; B41J 2/2146; B41J 2002/16573; B41J 29/393; H04N 1/00015; H04N 1/00031; H04N 1/00045; H04N 1/00082; H04N 1/00405; H04N 1/031
See application file for complete search history.

(56) References Cited

U.S. PATENT DOCUMENTS

| | | | |
|---|---|---|---|
| 2006/0092211 A1 | 5/2006 | Arakawa et al. | |
| 2012/0139982 A1* | 6/2012 | Abe | B41J 2/2142 347/14 |
| 2020/0180326 A1* | 6/2020 | Muramatsu | B41J 2/04541 |

FOREIGN PATENT DOCUMENTS

JP    2006-142807    6/2006

* cited by examiner

*Primary Examiner* — Anh T Vo

(57) ABSTRACT

In an image forming apparatus, a recording head ejects ink corresponding to an image to be printed, using arranged nozzles. A control unit determines nozzles corresponding to the image to be printed, correspondingly to a position of a print sheet, and causes the recording head to eject ink from the nozzles. A correction processing performs a correction process corresponding to each of ink ejection malfunction positions in the image. Further, the correction processing unit (a) sets the ink ejection malfunction positions as targets of the correction process in advance, and (b) excludes from the targets on the basis of a sheet size of the print sheet an ink ejection malfunction position corresponding to a nozzle that is not used for the print sheet among nozzles corresponding to the plural ink ejection malfunction positions and thereafter performs the correction process for the targets.

5 Claims, 6 Drawing Sheets

IMAGE FORMING APPARATUS

CROSS-REFERENCE TO RELATED APPLICATIONS

This application relates to and claims priority rights from Japanese Patent Application No. 2021-157555, filed on Sep. 28, 2021, the entire disclosures of which are hereby incorporated by reference herein.

BACKGROUND

1. Field of the Present Disclosure

The present disclosure relates to an image forming apparatus.

2. Description of the Related Art

An inkjet-type image forming apparatus detects a malfunction nozzle that becomes unable to properly eject ink, among nozzles that eject ink in a recording head, and changes an ink ejection amount for an adjacent dot on the basis of an occurrence status of the malfunction nozzle.

When printing on a cut sheet, a nozzle used to depict each pixel in an image to be printed is differently determined sheet by sheet on the basis of a sheet transportation condition and correspondingly to a position (i.e. a position in a direction perpendicular to a transportation direction) of an incoming sheet in transportation. As mentioned, if the ink ejection amount is corrected due to the malfunction nozzle, then in a short time from determination of the sheet position to ink ejection, it is required to determine a pixel corresponding to the malfunction nozzle in the image to be printed and to perform a correction process for a periphery of the determined pixel.

Therefore, if many ink ejection malfunction positions appear to be corrected, the aforementioned correction process can not be completed in the short time. Although such many ink ejection malfunction positions can be corrected by performing the correction process using high-speed hardware, such high-speed hardware results in a high cost of the apparatus.

SUMMARY

An image forming apparatus according to an aspect of the present disclosure includes a recording head, a control unit, and a correction processing unit. The recording head is configured to eject ink corresponding to an image to be printed, using arranged nozzles. The control unit is configured to determine nozzles corresponding to the image to be printed, correspondingly to a position of a print sheet, and cause the recording head to eject ink from the nozzles. The correction processing unit is configured to perform a correction process corresponding to each of plural ink ejection malfunction positions in the image. Further, the correction processing unit (a) sets the ink ejection malfunction positions as targets of the correction process in advance, and (b) excludes from the targets on the basis of a sheet size of the print sheet an ink ejection malfunction position corresponding to a nozzle that is not used for the print sheet among nozzles corresponding to the plural ink ejection malfunction positions and thereafter performs the correction process for the targets.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
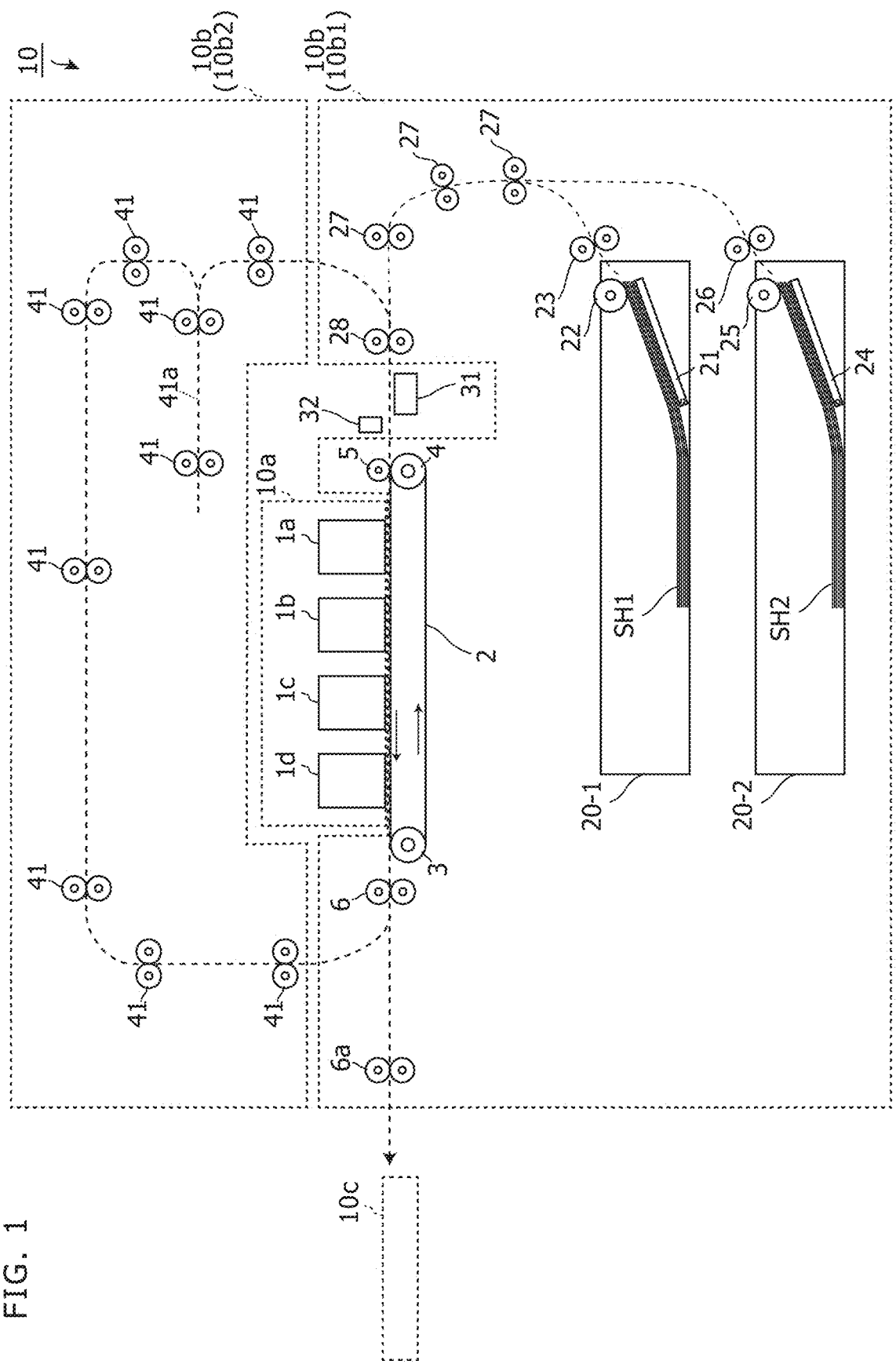
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 shown in FIG. 1 includes a print engine 10a and a sheet transportation unit 10b. The print engine 10a physically forms an image to be printed on a print sheet (print paper sheet or the like). In this embodiment, the print engine 10a is a line-type inkjet print engine.

In this embodiment, the print engine 10a includes line-type head units 1a to 1d corresponding to four ink colors: Cyan, Magenta, Yellow, and Black.

Figure 2:
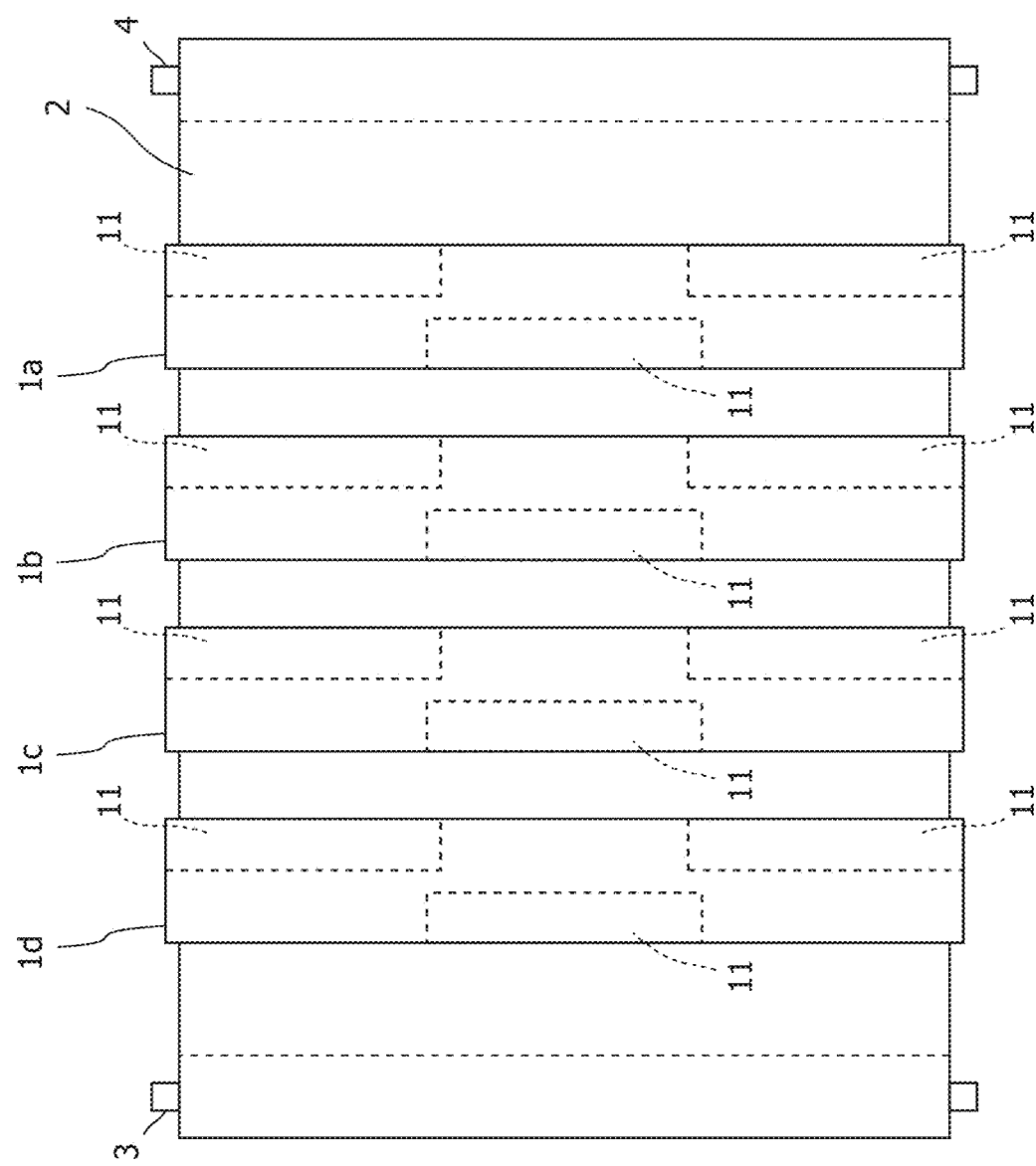
FIG. 2 shows a plane view of an example of recording heads 1a to 1d in the image forming apparatus 10 shown in FIG. 1.

FIG. 2 shows a plane view of an example of recording heads 1a to 1d in the image forming apparatus 10 shown in FIG. 1. As shown in FIG. 2, for example, in this embodiment, each of the inkjet recording units 1a, 1b, 1c and 1d includes plural (here, three) head units 11. The head units 11 are arranged along a primary scanning direction, and are capable of being mounted to and demounted from a main body of the image forming apparatus. Each of the inkjet recording units 1a, 1b, 1c and 1d may include only one head unit 11. The head unit 11 of the inkjet recording unit 1a, 1b, 1c or 1d includes 2-dimensionally arranged nozzles, and ejects ink corresponding to the image to be printed using the nozzles.

The sheet transportation unit 10b transports the print sheet to the print engine 10a along a predetermined transportation path, and transports the print sheet after printing from the print engine 10a to a predetermined output destination (here, an output tray 10c or the like).

The sheet transportation unit 10b includes a main sheet transportation unit 10b1 and a circulation sheet transportation unit 10b2. In duplex printing, the main sheet transportation unit 10b1 transports to the print engine 10a a print sheet to be used for printing of a first-surface page image, and the circulation sheet transportation unit 10b2 transports the print sheet from a posterior stage of the print engine 10*a* to a prior stage of the print engine 10*a*.

In this embodiment, the main sheet transportation unit 10*b*1 includes (a) a circular-type transportation belt 2 that is arranged so as to be opposite to the print engine 10*a* and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6*a*.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1*a* to 1*d* in turn, and on the print sheet, images of respective colors are printed by the inkjet recording units 1*a* to 1*d*. Subsequently, after the color printing, the print sheet is outputted by the output roller pairs 6 and 6*a* to an output tray 10*c* or the like.

Further, the main sheet transportation unit 10*b*1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2.

When performing duplex printing, the circulation sheet transportation unit 10*b*2 returns the print sheet from a predetermined position in a downstream side of the print engine 10*a* to a predetermined position in an upstream side of the print engine 10*a* (here, to a predetermined position in an upstream side of a line sensor 31 mentioned below). The circulation sheet transportation unit 10*b*2 includes a transportation roller 41, and a switch back transportation path 41*a* that reverses a movement direction of the print sheet in order to change a surface that should face the print engine 10*a* among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side edges) of the print sheet. For example, the line sensor 31 is a CIS (Contact Image Sensor). In this embodiment, the line sensor 31 is arranged at a position between the registration roller 28 and the print engine 10*a*.

The sheet detecting sensor 32 is an optical sensor that detects that a top end of the print sheet SH1 or SH2 passes through a predetermined position on the transportation path. The line sensor 31 detects the positions of the both side end edges at a time point that the top end of the print sheet SH1 or SH2 is detected by the sheet detecting sensor 32.

For example, as shown in FIG. 1, the print engine 10*a* is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10*b*2 transports the print sheet from the downstream side of the print engine 10*a* to the upstream side of the line sensor 31 with changing an orientation of the print sheet in a switch back manner. For example, in duplex printing, the print sheet after printing is transported to the upstream side, and the print sheet on which a test pattern mentioned below has been printed is transported to the line sensor 31 and thereafter a scanned image of the test pattern is generated by the line sensor 31.

Figure 3:
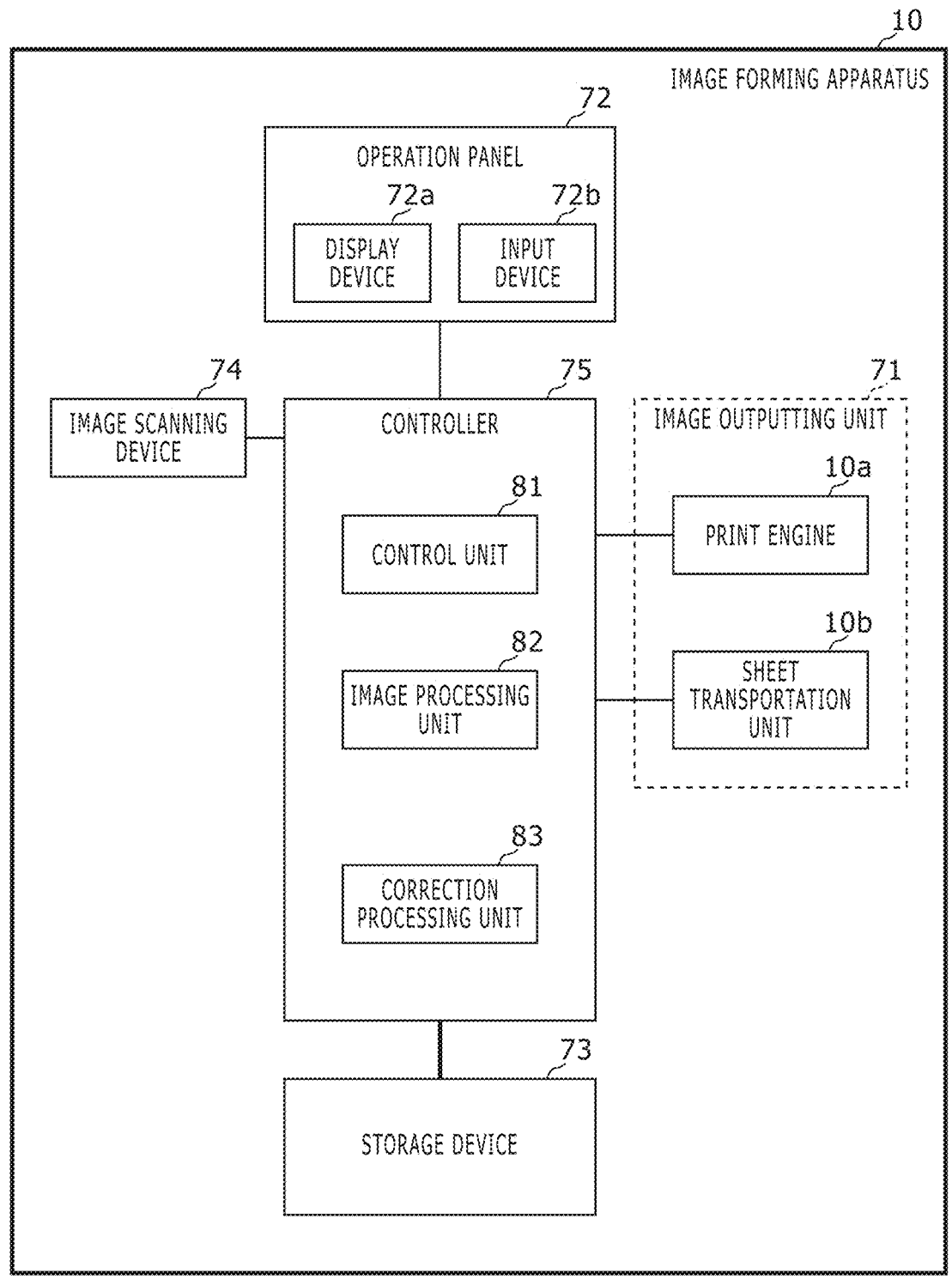
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device 72*a* such as a liquid crystal display and an input device 72*b* such as a hard key and/or touch panel, and displays sorts of messages for a user using the display device 72*a* and receives a user operation using the input device 72*b*.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, and a correction processing unit 83.

The control unit 81 controls the image outputting unit 71 (the print engine 10*a*, the sheet transportation unit 10*b* and the like), and thereby performs a print job requested by a user. In this embodiment, the control unit 81 causes the image processing unit 82 to perform a predetermined image process, and controls the print engine 10*a* (the head units 11) and causes the head units 11 to eject ink and thereby forms a print image on a print sheet. The image processing unit 82 performs a predetermined image process such as RIP (Raster Image Processing), color conversion, halftoning and/or the like for image data of a printing image.

Specifically, the control unit 81 causes the print engine 10*a* to print a user document image based on printing image data specified by a user.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process.

Here, the control unit 81 may automatically determine a size of a print sheet SH1 or SH2 on the basis of the positions of the aforementioned both side end edges. Alternatively, the control unit 81 may automatically determine a size of a print sheet SH1 or SH2 on the basis of a print job request or the like specified by a user.

Specifically, in the automatic centering function, the control unit 81 changes a depicting position of the image to be printed, in a primary scanning direction by a difference between a reference center position of the print engine 10a and the actual sheet center position. In this embodiment, because the nozzles of the recording heads 1a to 1d do not move, a nozzle corresponding to each pixel in the image to be printed is changed correspondingly to the depicting position of the image to be printed.

As mentioned, the control unit 81 determines nozzles corresponding to the image to be printed (a nozzle corresponding to each pixel), correspondingly to a position of a print sheet, and causes the recording heads 1a to 1d to eject ink from the determined nozzles.

The correction processing unit 83 performs as a hardware process the correction process corresponding to each of the plural ink ejection malfunction positions in the image to be printed. In this correction process, for example, image data (a pixel value) of a pixel adjacent to the ink ejection malfunction position is corrected such that a density of this adjacent pixel gets higher.

Specifically, the correction processing unit 83 (a) sets the aforementioned ink ejection malfunction positions as targets of the aforementioned correction process in advance, and (b) excludes from the targets on the basis of a sheet size of the print sheet an ink ejection malfunction position corresponding to a nozzle that is not used for this print sheet among nozzles corresponding to the plural ink ejection malfunction positions and thereafter performs the correction process for the targets.

Further, in this embodiment, if the number of the ink ejection malfunction positions after the exclusion exceeds a predetermined upperlimit value, the correction processing unit 83 (a) selects ink ejection malfunction positions of which the number is equal to or less than the upperlimit value on the basis of densities of the ink ejection malfunction positions in a scanned image of the test pattern, and (b) performs the correction process corresponding to the selected ink ejection malfunction positions. The correction process is not performed for any other ink ejection malfunction positions than the ink selected ejection malfunction positions. It should be noted that the test pattern is a band-shaped solid image along the primary scanning direction.

Specifically, the higher a degree of ink ejection malfunction is, the lower a density of the ink ejection malfunction position is, and therefore, the ink ejection malfunction positions are selected sequentially in a density order from lowest density.

Figure 4:
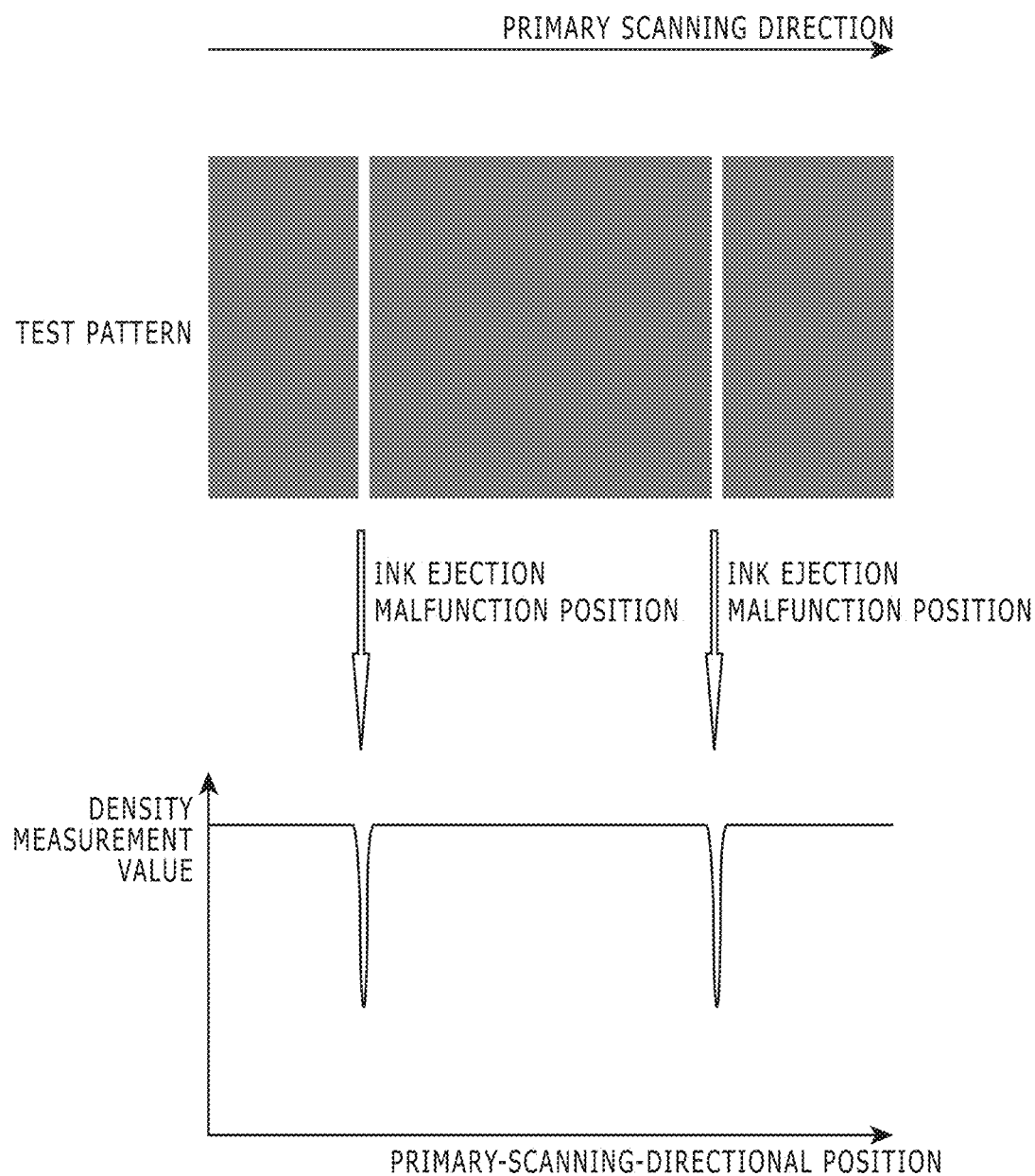
FIG. 4 shows a diagram that explains detection of an ink ejection malfunction position based on a density distribution of a test pattern image.

FIG. 4 shows a diagram that explains detection of an ink ejection malfunction position based on a density distribution of a test pattern image. In this embodiment, because the line sensor 31 is installed to detect a position of a print sheet, for example, the test pattern is printed with a predetermined ink droplet size on the print sheet, the circulation transportation unit 10b2 transports the print sheet, the line sensor 31 scans an image of the printed test pattern, and the ink ejection malfunction position is detected on the basis of a primary-scanning-directional density distribution of this image. For example, as shown in FIG. 4, a position of a dip in the density distribution is detected as the ink ejection malfunction position.

If the line sensor 31 is used for the detection of the ink ejection malfunction position as mentioned, an image of the test pattern is automatically scanned and the ink ejection malfunction position is automatically detected on the basis of the scanned image, and thereafter the print sheet on which the test pattern has been printed is outputted. Instead of the line sensor 31, the print sheet on which the test pattern has been printed may be immediately outputted and set on the image scanning device 74 by a user, and the image on the print sheet (i.e. an image of the test pattern) may be scanned by the image scanning device 74.

Figure 5:
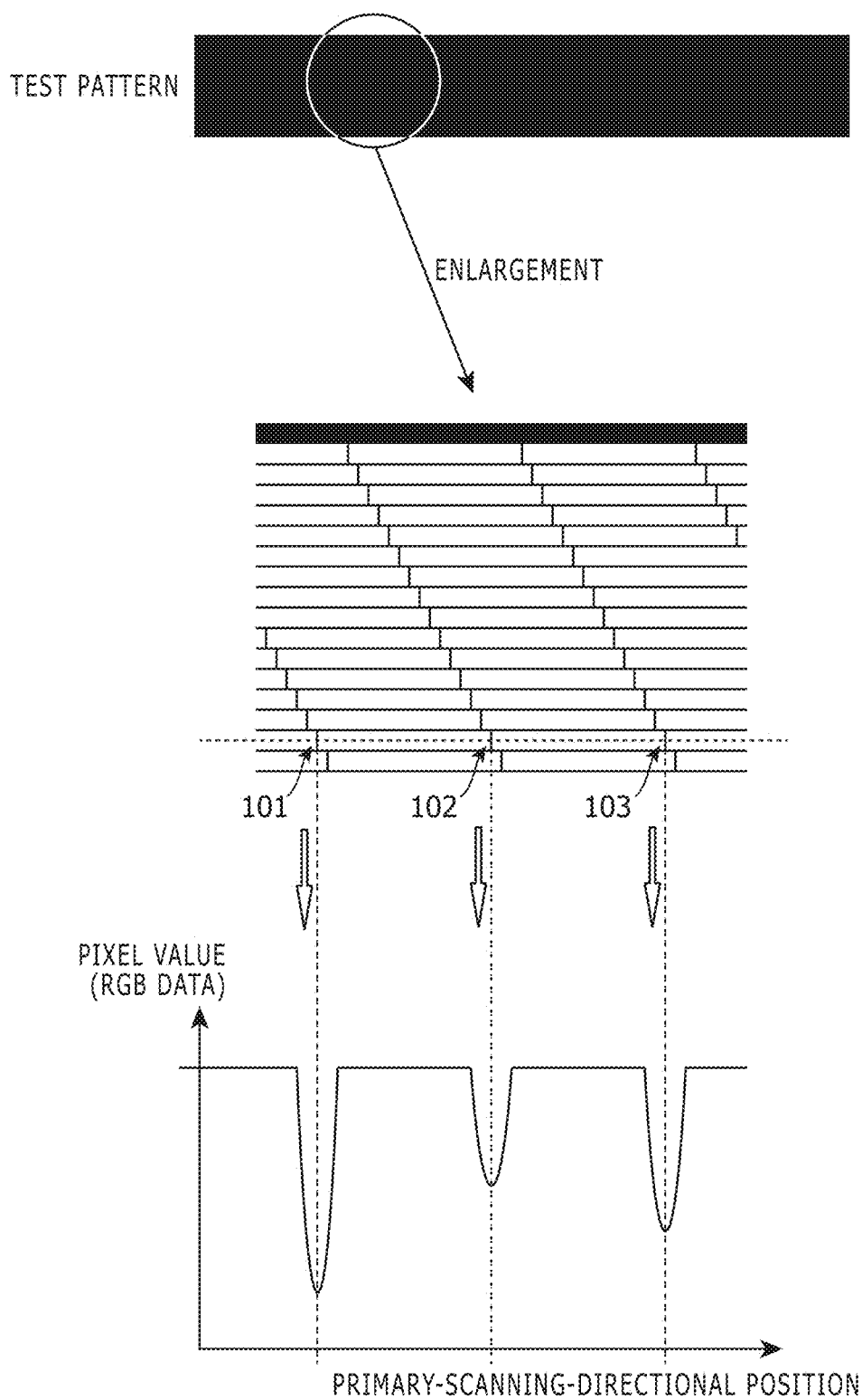
FIG. 5 shows a diagram that explains a density difference of ink ejection malfunction positions.

FIG. 5 shows a diagram that explains a density difference of ink ejection malfunction positions. Further, as shown in FIG. 5, for example, densities at primary scanning directional positions 101 to 103 in a scanned image of the test pattern (here, pixel values of any of RGB in RGB data) are detected, a position of which the density is lower than a predetermined threshold value (in RGB data, the pixel value is higher than a predetermined threshold value) is detected as an ink ejection malfunction position, and a nozzle corresponding to this ink ejection malfunction position and a density of each ink ejection malfunction position (a pixel value in RGB data) are determined, and thereafter the ink ejection malfunction position, the corresponding nozzle, and the density are stored as correction setting data into the storage device 73. Afterward, in a printing behavior, the correction setting data is read, and printing is performed with the correction process based on the correction setting data in the aforementioned manner.

Figure 6:
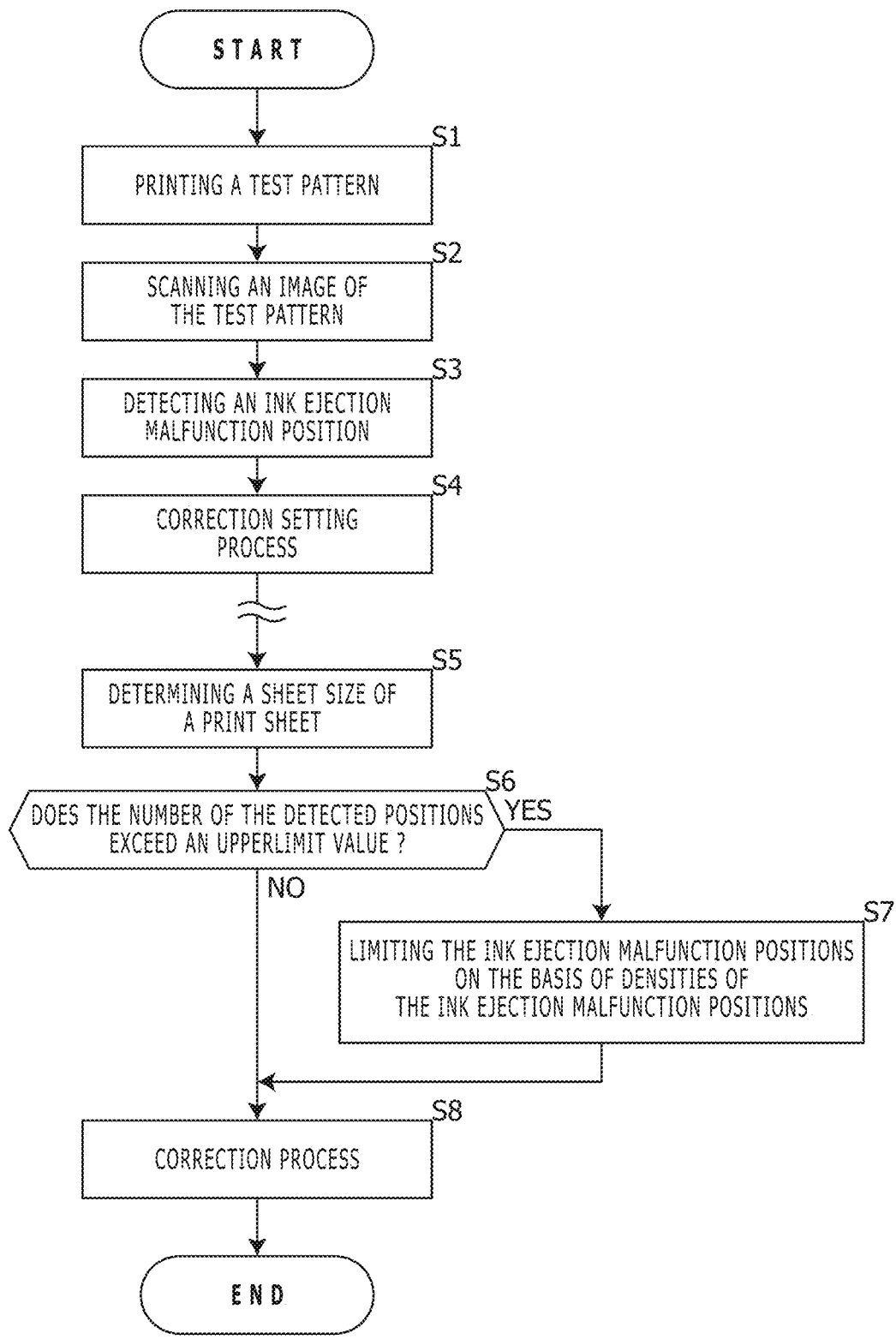
FIG. 6 shows a flowchart that explains a behavior of the image forming apparatus 10 shown in FIGS. 1 and 2.

The following part explains a behavior of the image forming apparatus 10. FIG. 6 shows a flowchart that explains a behavior of the image forming apparatus 10 shown in FIGS. 1 and 2.

(a) Detection and Setting of an Ink Ejection Malfunction Position

The correction processing unit 83 causes the image outputting unit 71 to print a test pattern on a print sheet (in Step S1).

The correction processing unit 83 acquires a scanned image (i.e. image data of each ink color) of the test pattern using the line sensor 31 or the image scanning device 74 as mentioned (in Step S2).

The correction processing unit 83 detects an ink ejection malfunction position on the basis of a density distribution of the scanned image in the primary scanning direction (in Step S3), and determines a nozzle corresponding to the ink ejection malfunction position and a density of the ink ejection malfunction position and stores as correction setting data data indicating the position, the nozzle, and the density (in Step S4).

(b) Behavior for Printing

Afterward, when receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

In this printing operation, the correction processing unit 83 determines a sheet size of a print sheet used in this printing operation (in particular, primary scanning directional size) (in Step S5), determines the number of nozzles corresponding to the ink ejection malfunction positions (ink ejection malfunction nozzles) among nozzles used for this sheet size, and determines whether the determined number of the nozzles exceeds a predetermined upperlimit value or not (in Step S6).

If the determined number of the ink ejection malfunction nozzles among nozzles used for this sheet size exceeds the predetermined upperlimit value, then the correction processing unit 83 selects ink ejection malfunction positions of which the number is equal to or less than the upperlimit value (e.g. equal to the upperlimit value) on the basis of densities of the ink ejection malfunction positions in the correction setting data (in Step S7), and performs the correction process corresponding to the selected ink ejection malfunction positions (in Step S8).

Contrarily, if the determined number of the ink ejection malfunction nozzles among nozzles used for this sheet size does not exceed the predetermined upperlimit value, then the correction processing unit 83 performs the correction process corresponding to all the ink ejection malfunction positions corresponding to the ink ejection malfunction nozzles among nozzles used for this sheet size (in Step S8).

As mentioned, in the aforementioned embodiment, the recording head 1a, 1b, 1c or 1d ejects ink corresponding to an image to be printed, using arranged nozzles. The control unit 81 determines nozzles corresponding to the image to be printed, correspondingly to a position of a print sheet, and causes the recording head 1a, 1b, 1c or 1d to eject ink from the nozzles. The correction processing unit 83 performs a correction process corresponding to each of the plural ink ejection malfunction positions in the aforementioned image. Specifically, the correction processing unit 83 (a) sets the ink ejection malfunction positions as targets of the correction process in advance, and (b) excludes from the targets on the basis of a sheet size of the print sheet an ink ejection malfunction position corresponding to a nozzle that is not used for this print sheet among nozzles corresponding to the plural ink ejection malfunction positions and thereafter performs the correction process for the targets.

Consequently, the correction process corresponding to ink ejection malfunction is effectively performed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
    a recording head configured to eject ink corresponding to an image to be printed, using arranged nozzles;
    a control unit configured to determine nozzles corresponding to the image to be printed, correspondingly to a position of a print sheet, and cause the recording head to eject ink from the nozzles; and
    a correction processing unit configured to perform a correction process corresponding to each of plural ink ejection malfunction positions in the image;
    wherein the correction processing unit (a) sets the ink ejection malfunction positions as targets of the correction process in advance, and (b) excludes from the targets on the basis of a sheet size of the print sheet an ink ejection malfunction position corresponding to a nozzle that is not used for the print sheet among nozzles corresponding to the plural ink ejection malfunction positions and thereafter performs the correction process for the targets.

2. The image forming apparatus according to claim 1, wherein if the number of the ink ejection malfunction positions exceeds a predetermined upperlimit value, the correction processing unit (a) selects ink ejection malfunction positions of which the number is equal to or less than the upperlimit value on the basis of densities of the ink ejection malfunction positions in a scanned image of the test pattern, and (b) performs the correction process corresponding to the selected ink ejection malfunction positions.

3. The image forming apparatus according to claim 2, wherein the correction processing unit performs the correction process for the selected ink ejection malfunction positions, and does not perform the correction process for ink ejection malfunction positions other than the selected ink ejection malfunction positions.

4. The image forming apparatus according to claim 1, wherein the correction processing unit performs the correction process as a hardware process.

5. The image forming apparatus according to claim 2, further comprising a line sensor configured to detect a position of the print sheet;
    wherein the line sensor generates the scanned image of the test pattern.

* * * * *